(12) United States Patent
Agami et al.

(10) Patent No.: US 8,843,400 B2
(45) Date of Patent: Sep. 23, 2014

(54) METHOD OF COLLECTING INFORMATION REGARDING ABSORBENT ARTICLES

(75) Inventors: Sion Agami, Mason, OH (US); Miguel Alvaro Robles, Wyoming, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 757 days.

(21) Appl. No.: 13/155,780

(22) Filed: Jun. 8, 2011

(65) Prior Publication Data

US 2012/0314042 A1    Dec. 13, 2012

(51) Int. Cl.
*G06Q 30/00*    (2012.01)
*G06Q 10/00*    (2012.01)
*H04N 9/80*     (2006.01)

(52) U.S. Cl.
USPC ........ 705/26.7; 705/1.1; 705/14.25; 386/239; 386/248

(58) Field of Classification Search
USPC ................ 705/1.1, 14.25, 26.7; 386/239, 248
See application file for complete search history.

(56) References Cited

U.S. PATENT DOCUMENTS

| | | | |
|---|---|---|---|
| 3,911,173 A | 10/1975 | Sprague, Jr. | |
| 3,929,135 A | 12/1975 | Thompson | |
| 4,324,246 A | 4/1982 | Mullane et al. | |
| 4,342,314 A | 8/1982 | Radel et al. | |
| 4,463,045 A | 7/1984 | Ahr et al. | |
| 4,573,986 A | 3/1986 | Minetola et al. | |
| 4,785,996 A | 11/1988 | Ziecker et al. | |
| 4,842,666 A | 6/1989 | Werenicz | |
| 5,006,394 A | 4/1991 | Baird | |
| 5,087,239 A | 2/1992 | Beastall et al. | |
| 5,279,541 A | 1/1994 | Frayman et al. | |
| 2007/0160365 A1* | 7/2007 | Aoyagi | 396/429 |
| 2008/0043111 A1* | 2/2008 | Anderson | 348/211.3 |
| 2008/0147730 A1* | 6/2008 | Lee et al. | 707/104.1 |
| 2010/0198700 A1* | 8/2010 | Ramaswamy | 705/27 |

\* cited by examiner

*Primary Examiner* — Daquan Zhao
(74) *Attorney, Agent, or Firm* — Andres E. Velarde (57) ABSTRACT

Methods of collecting information from an individual regarding absorbent articles are provided. A method entails collecting input information from an individual regarding absorbent article use wherein at least some of the information collected includes data generally known by most consumers. The method further entails collecting still or video image data from an individual consumer using a computing device and uploading the input information and still or video image data to a server. The input information and still or video image data is used to output data regarding the absorbent articles and to output a set of correlations between the visual data and the input information.

20 Claims, 4 Drawing Sheets

METHOD OF COLLECTING INFORMATION REGARDING ABSORBENT ARTICLES

FIELD OF INVENTION

The present invention is directed to methods of collecting information from individuals, and more specifically, to methods of collecting information from individuals using computing devices and mobile computing devices.

BACKGROUND OF THE INVENTION

Consumer goods companies may use consumer studies to learn how the absorbent articles may be improved. This is because women all have different levels of overall menstrual flow throughout their cycle and have different absorbent article needs. Often, a woman's menstrual cycle is typically characterized by initial light flow which subsequently increases and finally tapers off to the end of the period. When placing an absorbent article test, absorbent articles are used throughout a cycle leading to the opportunity for learning how different absorbent articles handle different flow properties. However, there is no way to determine if an absorbent article is used appropriately in the privacy of the user's home. In addition, the study may require the collection of data during and after a test, including for example, consumer perceptions and the used test absorbent articles. This can lead to various complications since the absorbent articles must be properly handled both by the user and by the consumer goods company that is placing the study. Further, handling during the collection of the used test absorbent article represents additional stresses on the test absorbent article that may further impact the results.

Consequently, the need remains for a method that allows the consumer to provide the information without requiring return of the used absorbent article. In addition, the need remains for a method that allows for the collection of data in real time. Furthermore, there remains a need for a method that allows for increased accuracy in the collection of data regarding the used test absorbent article.

SUMMARY OF THE INVENTION

A method of collecting information from an individual regarding absorbent articles is provided. The method entails collecting input information from an individual regarding absorbent article use wherein at least some of the information collected includes data generally known by most consumers. The method further entails collecting still or video image data from an individual consumer using a computing device and uploading the input information and still or video image data to a server. The input information and still or video image data is used to output data regarding the absorbent articles and to output a set of correlations between the visual data and the input information.

Also provided is a method of collecting information from an individual regarding absorbent articles. The method entails collecting still or video image data from an individual consumer using a computing device and uploading the still or video image data to a server. The still or video image data is used to output data regarding the absorbent articles and to output a set of correlations between the still or video image data and the absorbent article.

BRIEF DESCRIPTION OF THE DRAWINGS

While the specification concludes with claims particularly pointing out and distinctly claiming the subject matter of the present invention, it is believed that the invention can be more readily understood from the following description taken in connection with the accompanying drawings, in which:

DETAILED DESCRIPTION OF THE INVENTION

The present invention is directed to methods of collecting information from individuals using computing devices and mobile computing devices. As mobile devices become more powerful and common, the opportunity for the collection of data has expanded. Traditional consumer studies require the collection of used absorbent articles so that the absorbent article may be evaluated and observed. This means that both the consumer and the test placer must handle the absorbent article. Further, it represents that a lag exists between when the absorbent article is used and when the used absorbent article can be examined. The claimed invention solves the problems and is directed to a method for collecting information from a consumer in real time. The information can include certain characteristics of the consumer's menstrual cycle and/or the absorbent articles, both before and after use. The information collected can be used to make correlations between the data and the information to develop future absorbent articles and/or to provide product selection recommendations.

The following text sets forth a broad description of numerous different examples of the present disclosure. The description is to be construed as exemplary only and does not describe every possible combination of elements since describing every possible combination of elements would be impractical, if not impossible. It will be understood that any feature, characteristic, component, composition, ingredient, absorbent article, step or methodology described herein can be deleted, combined with or substituted for, in whole or part, any other feature, characteristic, component, composition, ingredient, absorbent article, step or methodology described herein. Numerous alternative combinations could be implemented, using either current technology or technology developed after the filing date of this patent, which would still fall within the scope of the claims. All publications and patents cited herein are incorporated herein by reference.

More specifically, examples disclosed herein may be configured as a system, mobile computing device, method, and/or non-transitory computer-readable medium for identifying an absorbent article from a real-time still or video image, as well as providing an altered version of the real-time image. More specifically, in some examples, the user may direct an image capturing device, such as a camera, at an absorbent article. The image capturing device may be configured to capture a real-time still or video image of the absorbent article.

The image capturing device may also be physically and/or communicatively coupled to a mobile computing device and a display device. The mobile computing device may include a memory that stores a computer application that guides a user through the data input, image capturing, and upload process. Additionally, the user can indicate to the mobile computing device a keyword or other indicator related to the absorbent article during the upload process. The keyword may serve as a common identifier for the absorbent article given to all users to help interpret the uploaded data.

Additionally, the computer application may cause the mobile computing device to alter the real-time still or video image. As described herein, alterations of the real-time still or video image may include highlighting the absorbent article, such as creating a virtual outline around the absorbent article, creating a computer graphics interface (CGI) overlay, "graying out" background, and tagging areas of the absorbent article image with virtual objects such as, for example, arrows, lines, and/or circles. Additionally, the mobile computing device may be configured with network capabilities (e.g., to transfer absorbent article information and data to a server, etc.).

It should be understood that by graying out a background surrounding the absorbent article, the mobile computing device may utilize any visual means to de-emphasize the non-desired area. This could include converting the non-selected area to a grey-scale image, fuzzing or de-focusing the area, and putting a partial transmission mask over the area. Other mechanisms for de-emphasis are also included within the scope this disclosure.

As used herein, the term "comprising" means that the various components, ingredients, or steps, can be conjointly employed in practicing the present invention. Accordingly, the term "comprising" encompasses the more restrictive terms "consisting essentially of" and "consisting of." Other terms may be defined as they are discussed in greater detail below.

As used herein, the term "computing device" refers to a system comprising an input device, a processor, at least one memory, and at least one output device coupled together via electrical circuitry or other suitable coupling means. Optionally, a network interface is also provided, for connecting a first computing device to a communications network.

Herein, the term "disposable absorbent articles" refers to articles which absorb and contain body fluids or exudates, and more specifically, refers to articles which are placed against or in proximity to the body of the wearer to absorb and contain the various exudates discharged from the body. The term "disposable" is used herein to describe absorbent articles which are not intended to be laundered or otherwise restored or reused as an absorbent article (i.e., they are intended to be discarded after a single use, and preferably, to be disposed of in an environmentally compatible manner). Typical disposable feminine hygiene absorbent articles according to the present invention are sanitary napkins, panty liners, tampons, absorbent articles for adult incontinence or the like. Feminine hygiene articles do not include baby diapers.

Herein, the term "feminine hygiene absorbent article" is used in a broad sense including any article able to receive and/or absorb and/or contain and/or retain body fluids/bodily exudates such as menses, vaginal secretions, and urine. Exemplary feminine hygiene absorbent articles include disposable feminine hygiene absorbent articles. Such articles include tampons, sanitary napkins, interlabial products, incontinence devices, and pantiliners.

As used herein, the term "image capturing device" refers to a device capable of capturing a still or video image. Such image capturing devices include digital cameras, webcams, mobile phones, and tablets with image capturing software. The image capturing device may be physically and/or communicatively coupled to a mobile computing device and a display device.

As used herein, the term "input device" refers to a device used to interact with a computing device, for example, a computer mouse, electronic stylus (or "pen"), touch screen, keyboard, keypad, microphone/voice recognition system, scanner, or other suitable apparatus for entering information in electronic form known in the art. The input/output hardware may include and/or be configured to interface with a monitor, positioning system, keyboard, mouse, printer, image capturing device, microphone, speaker, gyroscope, compass, and/or other device for receiving, sending, and/or presenting data.

As used herein, the term "memory" refers to a volatile or non-volatile storage media, such as ROM, SRAM, DRAM, and/or other types of RAM, flash memory, secure digital (SD) memory, registers, compact discs (CD), digital versatile discs (DVD), and/or other types of non-transitory computer-readable mediums. As is well known in the art, memory may include a plurality of distributed memory coupled via electrical circuitry. These non-transitory computer-readable mediums may reside within the mobile computing device and/or external to the mobile computing device. Additionally, the memory component may be configured to store operating logic and an absorbent articles application. The absorbent articles application may include a plurality of different pieces of logic including the absorbent article identification logic, the absorbent article selection logic, and the real-time still or video image capturing and altering logic, each of which may be embodied as a computer program, firmware, and/or hardware, as an example.

As used herein, the term "mobile computing device" may include a mobile telephone, personal digital assistant, laptop computer, tablet, and/or other mobile device. A mobile computing device may have a memory that stores a computer application that causes the mobile computing device to prompt the individual to capture a real time image of the absorbent article.

As used herein, the term "output device" refers to a computer monitor, LCD display, flat-screen display (for example, gas-plasma, activematrix or ELD display), or similar device (including a display of a personal digital assistant or other handheld or portable device) suitable for display of visual information, and/or a speaker or other suitable device for outputting audio information, as known in the art.

As used herein, the term "photo alignment indicia" relates to a reference used to center the absorbent article in the still or video image created by the image capturing device. The photo alignment indicia may be cross hairs, a virtual boundary, the boundary of the still or video image itself, or a size closeness guide.

As used herein, the term "processor" relates to one or more suitable microprocessors well known in the art, which processes data and computing instructions received via input device or stored in memory. Processor executes computing instruction to perform processes such as those described below in accordance with the present invention. The processor may include any processing component operable to receive and execute instructions (such as from the data storage component and/or memory component). The input/output hardware may include and/or be configured to interface with a monitor, positioning system, keyboard, mouse, printer, image capturing device, microphone, speaker, gyroscope, compass, and/or other device for receiving, sending, and/or presenting data.

As used herein, the term "tampon" refers to any type of absorbent structure which is inserted into the vaginal canal for the absorption of fluid therefrom. Typically, tampons are constructed from an absorbent material which has been compressed in any or all of: the width direction; the radial direction; and the axial direction, in order to provide a tampon which is of a size and stability to allow insertion within the vagina. See, for example, U.S. Pat. No. 5,087,239 issued to Beastall et al. and U.S. Pat. No. 5,279,541 issued to Frayman et al. which are incorporated herein by reference in their entirety.

Figure 1:
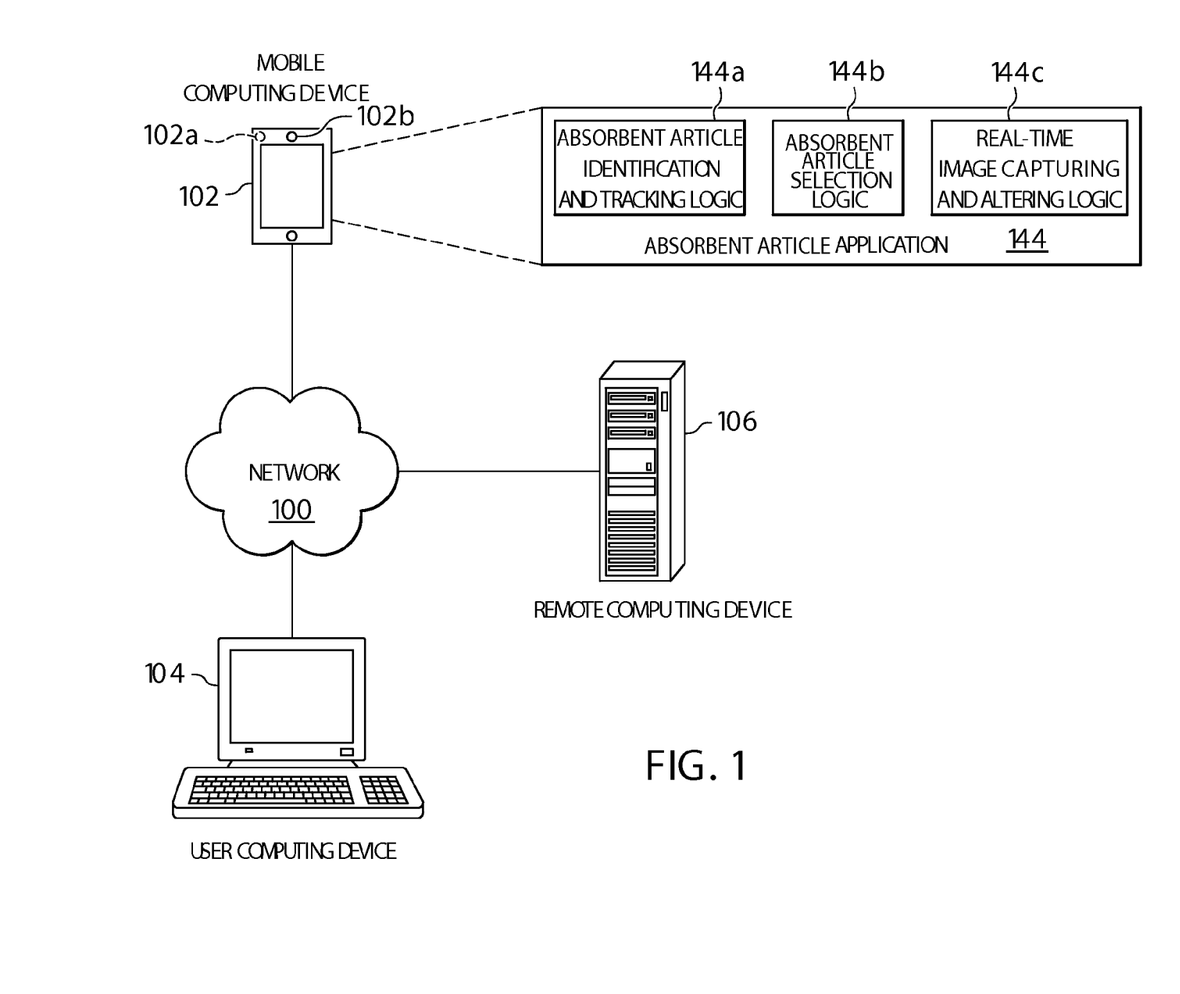
FIG. 1 depicts a computing environment, illustrating a system for data collection.

Referring now to the drawings, FIG. 1 depicts a computing environment, illustrating a system for data submission, according to examples shown and discussed herein. As illustrated in FIG. 1, a network 100 may include a wide area network, such as the Internet, a local area network (LAN), a mobile communications network, a public service telephone network (PSTN) and/or other network and may be configured to electronically couple a mobile computing device 102, a user computing device 104, and a remote computing device 106.

The mobile computing device 102 may include and/or be coupled to a first image capturing device 102(a) and a second image capturing device 102(b). The first image capturing device 102(a) may be positioned on a back side of the mobile computing device 102 (as indicated by the dashed circle) and may be configured to capture real-time video images, still images, and/or other images. Similarly, the second image capturing device 102(b) may be positioned opposite the first image capturing device 102(a) and may also be configured to capture still images, real-time video images, and/or other imagery. Further, it should be understood that, while the example of FIG. 1 illustrates the image capturing devices 102(a), 102(b) as being physically part of the mobile computing device 102, some examples may be configured such that the first image capturing device 102(a) and/or the second image capturing device 102(b) reside external to the mobile computing device 102. In such a combination of elements, the image capturing devices 102(a), 102(b) may communicate image data to the mobile computing device 102 via a wired and/or wireless protocol. Similarly, while the mobile computing device 102 of FIG. 1 may be illustrated with an attached display, this is also merely an example. In some combination of elements, the display may reside external to the mobile computing device 102 and may communicate with the mobile computing device 102 via a wired or wireless protocol. In some combination of elements, the mobile computing device 102 may have both image capturing devices 102(a) and 102 (b) positioned on the same side of the mobile computing device 102. The placement of both image capturing devices 102(a) and 102(b) on the same side may allow for stereoscopic image still or video capturing, commonly known as 3D images or video.

Also included in the mobile computing device 102 is an absorbent articles application 144, which includes absorbent article identification and tracking logic 144(a), absorbent article selection logic 144(b), and real time image capturing and altering logic 144(c). The absorbent article identification and tracking logic 144(a) may be configured to track the location of the identified absorbent article within the image, regardless of movement of the absorbent article or the mobile computing device 102. Additionally, the absorbent article identification and tracking logic 144(a) may be used to track an outline of an absorbent article relative to an underwear or undergarment and may determine the appropriate placement of the absorbent article on the underwear or undergarment. The absorbent article tracking and identification logic 144(a) may recognize the appropriate undergarment for proper placement. Alternatively, the absorbent article tracking and identification logic 144(a) may request that the individual user input the appropriate undergarment. The absorbent article identification and tracking logic 144(a) may also be used to track a stain on the absorbent article chosen by the user. In tracking a stain, the tracking logic 144(a) may allow the user to enhance the desired stained area. Similarly, the absorbent article selection logic 144(b) may be configured to cause the mobile computing device 102 to determine the absorbent article the user is testing. Similarly, the real-time video capturing and altering logic 144(b) may be configured to render a real-time still or video image for display, as well as alter the imagery, as described in more detail below.

Additionally, while the mobile computing device 102 is illustrated with the absorbent article selection logic 144(b), and the real-time still or video image capturing and altering logic 144(c), within the absorbent articles application, this is also an example. More specifically, in some examples, a single piece of logic may perform the described functionality. Similarly, in some examples, this functionality may be distributed to a plurality of different pieces of logic, which may reside in the mobile computing device 102 and/or elsewhere. Additionally, while only one application is illustrated as being stored by the memory component, other applications may also be stored in the memory component and utilized by the mobile computing device 102.

Also illustrated in FIG. 1 is the user computing device 104. More specifically, the user computing device 104 may be configured to communicate with the mobile computing device 102 via the network 100 or through a wired connection. The user computing device 104 may also be connected to an image capturing device 102(a) via the network or through a wired connection. In some examples, the mobile computing device 102 may send stored data to the user computing device 104 for backup. This data may be sent to the mobile computing device 102 to enhance accuracy of determinations made by the mobile computing device 102 and access remotely stored user profile information. Data sent to a user computing device 104 may be password protected.

Similarly, the remote computing device 106 may also be coupled to the network 100 and may be configured to communicate with the mobile computing device 102 (and/or with the user computing device 104) to receive data uploads and to upload data to the mobile computing device 102 application or to further enhance performance of the mobile computing device 102.

The network 100 interface hardware may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the mobile computing device 102 and other computing devices.

It should be understood that while the mobile computing device 102, the user computing device 104, and the remote computing device 106 are depicted as PDAs, personal computers and/or servers, these are merely examples. More specifically, in some combination of elements any type of computing device (e.g. mobile computing device 102, personal computer, server, etc.) may be utilized for any of these components. Additionally, while each of these computing devices is illustrated in FIG. 1 as a single piece of hardware, this is also an example. More specifically, each of the computing devices—may represent a plurality of computers, servers, databases, etc.

The activities which might take place in establishing a connection between a mobile computing device 102 and a server may include steps like setting up a connection setting with the server. If this is the first time the user has established a connection from the mobile computing device 102, then these connection settings can be inputted (e.g., entering a unique user name and password of the individual user of the mobile computing device 102, as well as network address for the server). Alternatively, if the user has already used the mobile computing device 102, and has saved connection settings previously, these settings could be loaded and used rather than having to be separately input. A password may be requested each time regardless of prior submissions for the sake of security.

In the example of FIG. 1, test absorbent article surveys may be created using the remote computing device 106. The surveys can also be conducted using first computing device, but it is understood that surveys may be conducted manually, e.g., using paper forms. Survey results are analyzed and reviewed using first computing device. The processes of creating, and conducting surveys, and analyzing and reviewing survey results, are described more fully below.

The remote computing device 106 may be a "server" computer such as a microcomputer or personal computer, or, depending on the volume of surveys to be created and/or survey data to be collected, a computer with greater storage and/or processing capacity, such as a minicomputer or mainframe. The remote computing device 106 or server may be secured using known security software to ensure confidentiality and security of the data submitted by consumers. One or more remote computing devices 106 are used by an individual to create customized surveys that are sent to the individuals using the test absorbent article. Once a survey is created, it is transferred or uploaded to the first computing device via network.

Once the connection with the server has been established, the user can use the mobile computing device 102 to determine data for upload, such as by filling out a form with appropriate metadata, and adding media to that form. Once the form has been filled out and the media captured, the application on the mobile device can validate the form data, such as by verifying that any media elements to be uploaded are properly identified. The data could then be packaged into the proper format (e.g., mapped into a data structure having fields corresponding to columns in a table in the database), and added to an upload queue.

Finally, when the upload is complete, the upload remnants can be removed from the mobile computing device 102 and the server. Specifically, once the upload is complete and confirmed, the mobile device could send the server a delete upload request. The mobile device and the server could then remove the data, thereby leaving the database or remote computing system as storing the master copy of the uploaded information, and freeing up the resources of the server and mobile devices. This may help ensure confidentiality by removing still and video image data from the mobile computing device 102.

Figure 2:
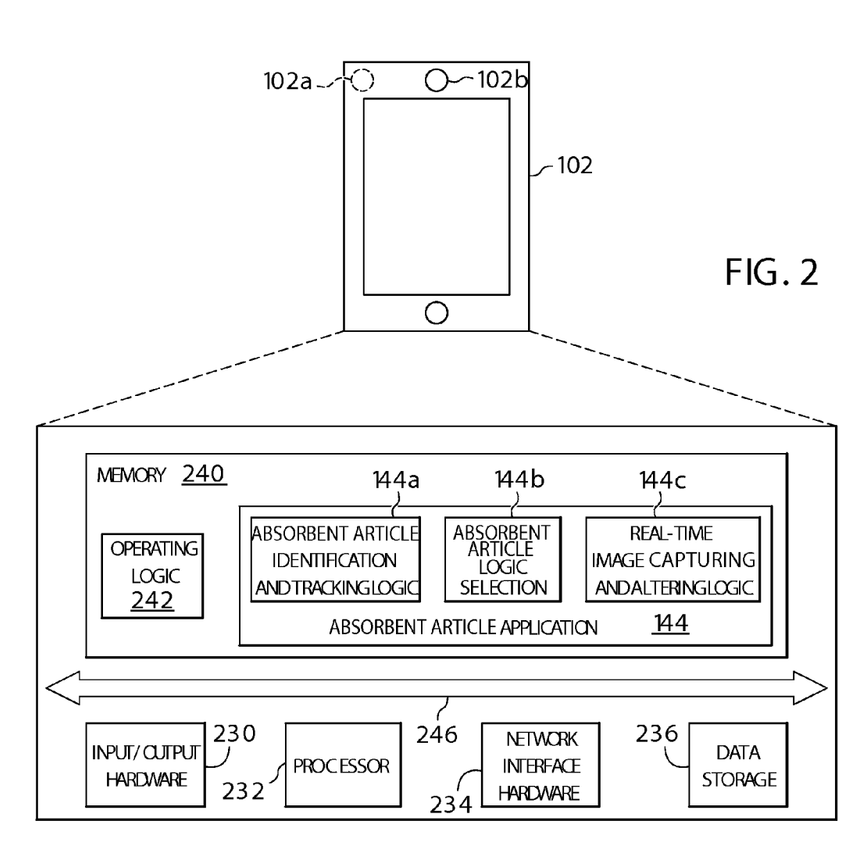
FIG. 2 depicts a mobile computing device, which may be utilized in the computing environment of FIG. 1 for data submission.

FIG. 2 shows a mobile computer device that may be utilized in the computing environment of FIG. 1. In the illustrated example, the mobile computing device 102 includes a processor 232, input/output hardware 230, network interface hardware 234, a data storage 236 component (which stores the user data, absorbent article data, and/or other data), and a memory 240 component. Additionally, the memory component 240 may be configured to store operating logic 242 and an absorbent articles application 144. The processor 232 may also include and/or be coupled to a graphical processing unit (GPU).

The absorbent article application 144 may cause the mobile computing device 102 to alter the real-time still or video image to provide information related to the absorbent article. As described herein, alterations of the real-time still or video image may include highlighting the absorbent article, such as creating a virtual outline or virtual frame around the absorbent article, creating a computer graphics interface (CGI) overlay, "graying out" background, tagging the absorbent article or portions of the absorbent article image with one or more virtual objects such as, for example, arrows, lines, and/or circles. The absorbent article application 144 may also provide for different image capturing options such as, for example, zoom, black and white or grayscale effects, negative effects, sepia effects, any other effect used to impact the visual image captured by the image capturing device 102(a). The computer application may also virtually add information supplied to by the individual to the image or video captured by the image capturing device 102(a). Information added may include, for example, a date stamp, an identification number for the individual, an identification number for the absorbent article, or any other information that may be helpful. Additionally, the mobile computing device 102 may be configured with network capabilities (e.g., to upload still or video image data of an absorbent article, etc.).

Specifically, combination of elements disclosed herein may be configured as a system, mobile computing device 102, method, and/or non-transitory computer-readable medium for identifying an absorbent article from a real-time still or video image, as well as providing an altered version of the real-time still or video image. More specifically, the user may direct an image capturing device, such as a camera at an absorbent article. The image capturing device may be configured to capture a real-time still or video image of the absorbent article.

The mobile computing device 102 may prompt the individual to submit information. Input information collected from the consumer may be in response to questions in the form of a survey. The consumer's response to these questions may then be used to determine areas of improvement in the absorbent articles and correlations between absorbent article characteristics and the still or video image data. Consumers may be asked to submit surveys both prior and after using the product. Similarly, a survey request may occur at certain times while using the product. For example, a survey request may require submission of surveys every 3 hours for up to 12 hours. Alternatively, a survey request may request submission within a fixed time after the consumer considers the absorbent article stained. A survey request may also occur in response to the submission of video or image data by the consumer. Questions asked may be focused on, for example, description of menstrual flow, perceived flow on the heaviest flow day, length of time absorbent article was used, comfort and fit of absorbent article, perceived leakage, unintentional urine loss, location of fluid on the absorbent article or undergarment, depth of fluid on the absorbent article, stain size, or any other suitable questions. Furthermore, these questions may be asked of the consumer in any suitable fashion, for example, via the mobile computing device 102, the World Wide Web, or a paper survey. Questions may also request the consumer's age, consumer's absorbent article preference, consumer's prior absorbent article use, what other feminine hygiene products the consumer has used or is currently using, consumer's description of her flow on her heaviest day of her period, how many absorbent articles in total does the consumer use in her period, time between changing absorbent articles on the consumer's heaviest day, any leaks while using an absorbent article on the consumer's heaviest day, what is the consumer's confidence that when the absorbent article is changed during the heaviest time that the absorbent article has been fully used, what is the level of confidence the consumer has regarding the absorbent article and her interaction with the absorbent article, and the consumer's impression of future concepts and ideas. Questions may also request information related to what types of undergarments the consumer uses, how often the consumer uses a particular type of undergarments, or how a consumer places the absorbent article in the undergarment. The submission of informational and still or video image data may prompt a new survey in response to the data supplied.

The questions may be used to determine categories that may be identified as profile, segment, and/or classification. This separation into profile, segment, and/or classification may be produced in any suitable fashion, including but not limited to, questions asked of consumers, such as questions about habits, traits, personality, and/or responses to visual situations and/or images of the consumers. The profile, segment, and/or classification into which a particular consumer belongs to may be similarly performed. These questions, for example, may be based on habits, traits, personality, and/or responses to visual situations and/or images of the consumers. One system of question asking to classify consumers into profile, segment, and/or classification is psychographic segmentation.

Any suitable combination of either individual questions or groups of questions may be asked in order to collect sufficient information to provide the basis for developing correlations used to improve absorbent articles. The precise manner and wording chosen to collect this information from the consumer may vary depending on local custom, the comfort level consumers in a particular area may have in describing their menstrual flow characteristics, and the shades of meaning associated with terms which may be used in different parts of the world to collect the information desired.

In accordance with yet another example of the present invention, the absorbent article application 144 allows the individual to keep a video and/or voice diary that may be submitted by the individual. The voice and/or video diary may be used to answer questions in the survey or to give subjective perception data on the absorbent article.

In accordance with yet another example of the present invention, a computer program product operates a remote computing device 106 to analyze the survey results and/or compare the survey results with other survey results; for example, to measure leaks or compare average length of time worn. The results of these studies can be used in a variety of ways to make correlations between visual images provided by the individuals and the absorbent articles thereby improving future absorbent articles.

Data collected by a computing device is eventually transferred to a remote computing device 106, where it is stored in memory 240. Suitable encryption algorithms known in the art or other suitable methods of encryption also can be used to protect the confidentiality of personally-identifiable information, such as first name, last name, and address, or other sensitive information.

Data may be stored in one or more databases or data warehouses in memory 240. The data storage 236 component may reside local to and/or remote from the mobile computing device 102 and may be configured to store one or more pieces of data for access by the mobile computing device 102 and/or other components. Generally, a database is an organized body of information, such as a collection of data arranged for search and retrieval, and may include structured tables or records, multiple computer files, or a single file. In the illustrated example, a relational database product such as SQLServer, Oracle, or Access can be used, although any other suitable means for storing and retrieving data also may be used.

It should be understood that the components illustrated in FIG. 2 are merely exemplary and are not intended to limit the scope of this disclosure. While the components in FIG. 2 are illustrated as residing within the mobile computing device 102, this is merely an example. In some combination of elements, one or more of the components may reside external to the mobile computing device 102. In addition, while the mobile computing device 102 in FIGS. 1 and 2 is illustrated as a single device, this is also merely an example. In some combination of elements, the absorbent article identification and tracking functionality, the absorbent article selection functionality, and the real-time still or video image capturing and altering functionality may reside on different devices.

Figure 3:
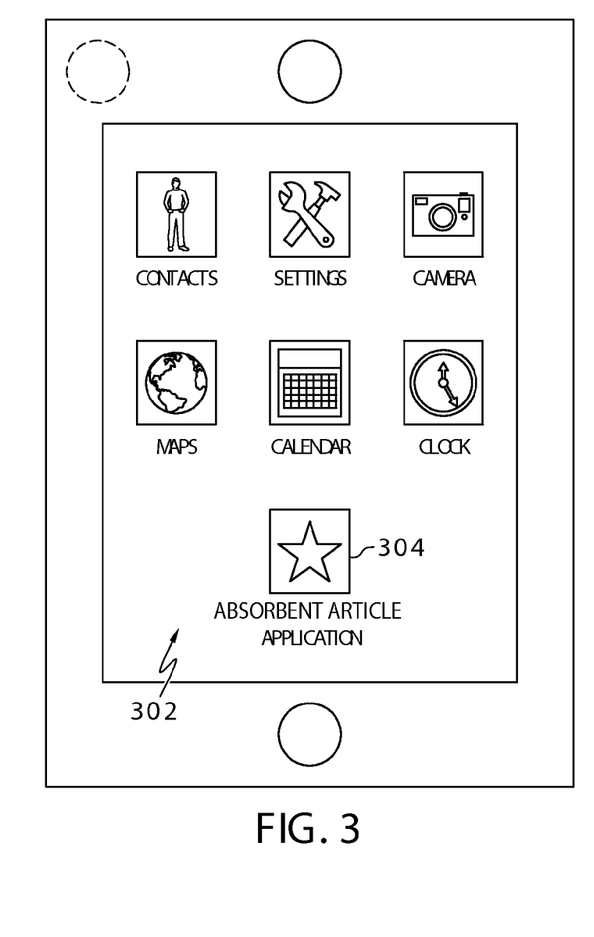
FIG. 3 depicts an interface for accessing a computer application for absorbent article identification.

FIG. 3 depicts an interface for accessing the absorbent articles application for absorbent article identification, according to examples shown and described herein. As illustrated, the mobile computing device 102 is configured to provide an interface (e.g., via the operating system). The interface 302 may be configured to provide the user with access to one or more computer applications 304 that are stored on the mobile computing device 102 and/or elsewhere. As illustrated, the mobile computing device 102 may include and provide options to access a contacts application, a settings application, a camera application, a maps application, a calendar application a clock application, and an absorbent articles application. As illustrated, the absorbent articles application may be accessed by selection of the absorbent articles application option. Other applications may also be provided.

It should be understood that while the mobile computing device 102 from FIG. 2 only illustrates the absorbent articles application, this is merely an example. More specifically, as discussed above, the absorbent articles application 304 may provide additional functionality, such as that provided by the computer applications of FIG. 3. Additionally, while the mobile computing device 102 depicted in FIG. 2 illustrates a single absorbent articles application 304, other computer applications may also reside in the memory 240 component.

Figure 4:
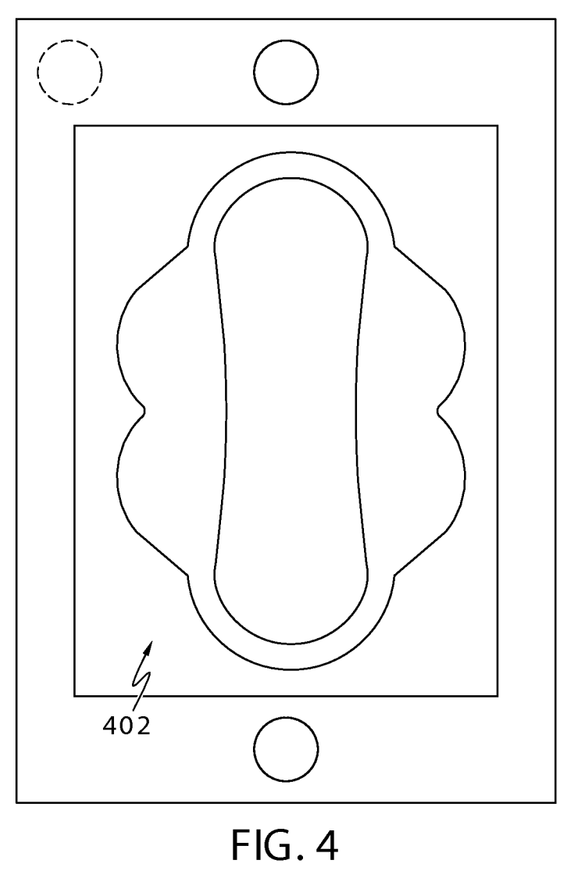
FIG. 4 depicts an interface of a real-time still or video image of a test absorbent article.

FIG. 4 depicts an interface of a real-time still or video image of how a still or video image of the absorbent article may appear on the mobile computing device 102, according to examples shown and described herein. As illustrated, in response to submitting the requested information, the mobile computing device 102 may be configured to receive, from the first image capturing device 102(a) real-time still or video image. The user may direct the first image capturing device 102(a) to an absorbent article.

When the individual chooses to capture a still or video image may be determined by various factors. The survey may request that the individual capture a still or video image after a certain amount of time. For example, the individual may be requested to wear the absorbent article for a period of 2 hours, 3 hours, 5 hours, or 7 hours prior to capturing a still or video image. A still or video image may also be requested by the survey when placing the absorbent article in an undergarment prior to wearing the undergarment to compare how individual fit or placement impacts results.

An individual may choose to capture the still or video image in any method or environment they see fit. Using the method described herein allows the user to capture a still or video image in the privacy of their home or any other suitable place. The capturing of a real time image of the absorbent article allows the user to upload the requested still or video image and information relating to the absorbent article use. This allows the collection of data both in real time and also without having to collect the actual absorbent articles for evaluation. Suitable environments may include, for example, a public or private bathroom or any other suitable environment.

To capture a still or video image of the absorbent article, an individual can place the absorbent article in front of the image capturing device. The individual would then initiate the appropriate application or turn on the image capturing device. To place the absorbent article in front of the image capturing device, the individual may choose to remove their undergarment and absorbent article or simply pull down the undergarment containing the absorbent article without removing the undergarment and moving the image capturing device so that the absorbent article is in front of the image capturing device. If photo alignment indicia are provided, the absorbent article can be centered using the photo alignment indicia. The still or video image may be captured and prepared to be uploaded via a computing device.

In a desire to compare still or video images taken by different users, a color standard may be distributed with the absorbent articles tested. The color standard may be any item that has a standardized color visible such as those used in the measurement and calibration of color. The standard color may be any suitable standard such as, for example, white, black or any combination of color tiles that may be found in calibrating for color. The color standard can be included in the still or video image with the absorbent article. This would allow cross comparison between different still or video images that were not taken with the same image capturing device.

The color standard may also be a fixed length, allowing it to serve as a length measuring standard. Alternatively, a length standard may be provided. The length standard allows for comparison and measurement regardless of whether an individual uses a zoom function on a part of the absorbent article.

The individual may also be requested to include other implements in the image or video of the absorbent article captured using an image capturing device. Implements may include an ultraviolet light, a scale to weigh the absorbent article, a backlight, a stand, or any other implement that is sent to the individual with the absorbent article in the study.

The methods of the invention can be used with any suitable feminine hygiene article. Suitable absorbent articles include any type of structures, from a single absorbent layer to more complex multi layer structures. Certain absorbent articles typically include a fluid pervious topsheet, a backsheet, which may be fluid impervious and/or may be water vapour and/or gas pervious, and an absorbent element often called "core" comprised there between.

The topsheet may be manufactured from a wide range of materials such as woven and nonwoven materials; polymeric materials such as apertured formed thermoplastic films, apertured plastic films, and hydroformed thermoplastic films; porous foams; reticulated foams; reticulated thermoplastic films; and thermoplastic scrims. Suitable woven and nonwoven materials can be included of natural fibers (e.g., wood or cotton fibers), synthetic fibers (e.g., polymeric fibers such as polyester, polypropylene, or polyethylene fibers) or from a combination of natural and synthetic fibers. In one embodiment, the topsheet may be made of a hydrophobic material to isolate the wearer's skin from liquids which have passed through the topsheet. If the topsheet is made of a hydrophobic material, at least the upper surface of the topsheet is treated to be hydrophilic so that liquids will transfer through the topsheet more rapidly. This diminishes the likelihood that body exudates will flow off the topsheet rather than being drawn through the topsheet and being absorbed by the absorbent core. In one embodiment, the topsheet can be rendered hydrophilic by treating it with a surfactant. Suitable methods for treating the topsheet with a surfactant include spraying the topsheet material with the surfactant and immersing the material into the surfactant.

The topsheet can include an apertured formed film. Apertured formed films can be used for the topsheet because they are pervious to body exudates and yet non-absorbent and have a reduced tendency to allow liquids to pass back through and rewet the wearer's skin. Thus, the surface of the formed film which is in contact with the body remains dry, thereby reducing body soiling and creating a more comfortable feel for the wearer. Suitable formed films are described in U.S. Pat. No. 3,929,135, entitled "Absorptive Structures Having Tapered Capillaries", issued to Thompson on Dec. 30, 1975; U.S. Pat. No. 4,324,246 entitled "Disposable Absorbent Article Having A Stain Resistant Topsheet", issued to Mullane, et al. on Apr. 13, 1982; U.S. Pat. No. 4,342,314 entitled "Resilient Plastic Web Exhibiting Fiber-Like Properties", issued to Radel, et al. on Aug. 3, 1982; U.S. Pat. No. 4,463,045 entitled "Macroscopically Expanded Three-Dimensional Plastic Web Exhibiting Non-Glossy Visible Surface and Cloth-Like Tactile Impression", issued to Ahr, et al. on Jul. 31, 1984; and U.S. Pat. No. 5,006,394 "Multilayer Polymeric Film" issued to Baird on Apr. 9, 1991.

The absorbent core can be any absorbent member which is generally compressible, conformable, non-irritating to the wearer's skin, and capable of absorbing and retaining body fluids. The absorbent core may be manufactured in a wide variety of sizes and shapes (e.g., rectangular, hourglass, "T"-shaped, asymmetric, etc.) and from a wide variety of liquid-absorbent materials commonly used in disposable pull-on garments and other absorbent articles such as comminuted wood pulp which is generally referred to as airfelt. Examples of other suitable absorbent materials include creped cellulose wadding; meltblown polymers including coform; chemically stiffened, modified or cross-linked cellulosic fibers; tissue including tissue wraps and tissue laminates; absorbent foams; absorbent sponges; superabsorbent polymers; absorbent gelling materials; or any equivalent material or combinations of materials.

The configuration and construction of the absorbent core may vary (e.g., the absorbent core may have varying caliper zones, a hydrophilic gradient, a superabsorbent gradient, or lower average density and lower average basis weight acquisition zones; or may include one or more layers or structures). Further, the size and absorbent capacity of the absorbent core may also be varied to accommodate wearers ranging from infants through adults. However, the total absorbent capacity of the absorbent core should be compatible with the design loading and the intended use of the absorbent article.

The absorbent core may include other optional components. One such optional component is the core wrap, i.e., a material, typically but not always a nonwoven material, which either partially or totally surrounds the core. Suitable core wrap materials include, but are not limited to, cellulose, hydrophilically modified nonwoven materials, perforated films and combinations thereof.

The backsheet can comprise a liquid impervious film. The backsheet can be impervious to liquids (e.g., body fluids) and can be typically manufactured from a thin plastic film. However, typically the backsheet can permit vapours to escape from the disposable article. In an embodiment, a microporous polyethylene film can be used for the backsheet. A suitable microporous polyethylene film is manufactured by Mitsui Toatsu Chemicals, Inc., Nagoya, Japan and marketed in the trade as PG-P.

One suitable material for the backsheet can be a liquid impervious thermoplastic film having a thickness of from about 0.012 mm (0.50 mil) to about 0.051 mm (2.0 mils), for example including polyethylene or polypropylene. Typically, the backsheet can have a basis weight of from about 5 g/m² to about 35 g/m². However, it should be noted that other flexible liquid impervious materials may be used as the backsheet. Herein, "flexible" refers to materials which are compliant and which will readily conform to the general shape and contours of the wearer's body.

The backsheet can be typically positioned adjacent the outer-facing surface of the absorbent core and can be joined thereto by any suitable attachment device known in the art. For example, the backsheet may be secured to the absorbent core by a uniform continuous layer of adhesive, a patterned layer of adhesive, or an array of separate lines, spirals, or spots of adhesive. Illustrative, but nonlimiting adhesives, include adhesives manufactured by H. B. Fuller Company of St. Paul, Minn., U.S.A., and marketed as HL-1358J. An example of a suitable attachment device including an open pattern network of filaments of adhesive is disclosed in U.S. Pat. No. 4,573,986 entitled "Disposable Waste-Containment Garment", which issued to Minetola et al. on Mar. 4, 1986. Another suitable attachment device including several lines of adhesive filaments swirled into a spiral pattern is illustrated by the apparatus and methods shown in U.S. Pat. No. 3,911,173 issued to Sprague, Jr. on Oct. 7, 1975; U.S. Pat. No. 4,785,996 issued to Ziecker, et al. on Nov. 22, 1978; and U.S. Pat. No. 4,842,666 issued to Werenicz on Jun. 27, 1989. Alternatively, the attachment device may include heat bonds, pressure bonds, ultrasonic bonds, dynamic mechanical bonds, or any other suitable attachment device or combinations of these attachment devices.

The backsheet may be additionally secured to the topsheet by any of the above-cited attachment devices.

The absorbent article may also include such other suitable features as are known in the art including, but not limited to, re-closable fastening system, lotion, acquisition layers, distribution layers, wetness indicators, sensors, elasticized waist bands and other similar additional elastic elements and the like, belts and the like, waist cap features, containment and aesthetic characteristics and combinations thereof.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed:

1. A method of collecting information from an individual regarding absorbent articles, the method comprising:
    (a) collecting input information from an individual regarding absorbent article use wherein at least some of the information collected includes data generally known by most consumers;
    (b) collecting still or video image data from an individual consumer using a computing device;
    (c) uploading input information and still or video image data to a server;
    (d) using the input information and still or video image data collected to output data regarding the absorbent articles;
    (e) using the input information and still or video image data collected to output a set of correlations between the visual data and the input information; and
    wherein the set of correlations are utilized to determine the appropriate placement of the absorbent article on the undergarment or to track a stain on the absorbent article.

2. The method of claim 1, wherein the absorbent article comprises a feminine hygiene pad, interlabial product, pantiliner, tampon, sanitary napkin, topsheet, or incontinence device.

3. The method of claim 1, wherein the information includes at least the perceived flow of the consumer on the heaviest flow day during the consumer's menstrual cycle.

4. The method of claim 1, wherein the step of collecting still or video image data from comprises:
    a. placing the absorbent article in proximity to a device configured to capture still or video image data;
    b. centering the absorbent article;
    c. capturing the still or video image data; and
    d. uploading the still or video image data using a computing device.

5. The method of claim 1, wherein the step of collecting still or video image data from comprises:
    a. placing an undergarment in proximity to a device configured to capture still or video image data;
    b. placing an absorbent article in the undergarment in the manner understood by the individual prior to wearing;
    c. centering the undergarment;
    d. capturing the still or video image data; and
    e. uploading the still or video image data using a computing device.

6. The method of claim 4, wherein the step of collecting still or video image data further comprises using a color standard in the photo.

7. The method of claim 1, wherein the step of collecting still or video image data comprises:
    a. placing the absorbent article in proximity to a computing device configured to capture still or video image data;
    b. opening an application on the computing device;
    c. selecting information from a drop down menu regarding the absorbent article;
    d. centering the absorbent article;
    e. capturing the still or video image data;
    f. uploading the still or video image data to a server through the application.

8. The method of claim 7, wherein the step of collecting still or video image data from a subject further comprises:
    a. using a virtual frame specific to the type of absorbent article chosen in the drop down menu; and
    b. centering the absorbent article using photo alignment indicia.

9. The method of claim 8, wherein the step of collecting still or video image data from a subject further comprises enhancing a stained area of the absorbent article.

10. The method of claim 7, wherein the computing device is
   a) a mobile device, tablet or handheld computer, the computing device comprising:
      i) a processor;
      ii) a display; and
      iii) a memory;
   wherein the memory stores an application, which, when executed by the processor, configures the mobile device to perform a set of acts comprising:
      1) receiving a set of questions specified from a remote computing device;
      2) allowing a user of the computing device to submit a form comprising the one or more questions and the still or video image data to a remote server;
   b) the remote server, the remote server comprising a processor and a memory, and configured, via instructions stored in the memory, to perform a set of acts comprising:
      i) sending the set of questions specified remotely from a computer to the computing device; and
      ii) receiving, from the computing device, the input data.

11. The method according to claim 1, wherein the output data is used to create improved questions.

12. The method of claim 1, wherein the steps of collecting information from the individual is performed using a telephone system.

13. The method of claim 1, wherein the steps of collecting information from the individual is performed using a computing device.

14. The method of claim 1, wherein input information and still or video image data is uploaded to a server wherein consumer input and still or video image data is collected from multiple consumers.

15. A method of collecting information from an individual regarding absorbent articles, the method comprising:
   (a) collecting still or video image data from an individual consumer using a computing device;
   (b) uploading still or video image data to a server;
   (c) using the still or video image data collected to output data regarding the absorbent articles; and
   (d) using the still or video image data collected to output a set of correlations between the still or video image data and the absorbent article,
   wherein the set of correlations are utilized to determine the appropriate placement of the absorbent article on the undergarment or to track a stain on the absorbent article.

16. The method according to claim 15, wherein the absorbent article is a feminine hygiene pad, interlabial product, pantiliner, tampon, sanitary napkin, topsheet, or incontinence device.

17. The method of claim 15, wherein the step of collecting still or video image data comprises:
   a. placing the absorbent article in proximity to a computing device configured to capture still or video image data;
   b. opening an application on the computing device;
   c. selecting information from a drop down menu regarding the absorbent article;
   d. centering the absorbent article;
   e. capturing the still or video image data;
   f. uploading the still or video image data to a server through the application.

18. The method of claim 17, wherein the absorbent article is worn for a minimum of three hours prior to having the still or video image data captured.

19. The method of claim 17, wherein the step of collecting still or video image data further comprises enhancing a stained area of the absorbent article.

20. The method of claim 17, wherein the still or video image data uploaded to the server is password protected.

* * * * *